US008036524B2

(12) United States Patent
Lee et al.

(10) Patent No.: US 8,036,524 B2
(45) Date of Patent: Oct. 11, 2011

(54) AUTO-FOCUSING APPARATUS AND METHOD FOR CAMERA

(75) Inventors: Hae-Sun Lee, Seoul (KR); Young-Kwon Yoon, Seoul (KR); Yong-Gu Lee, Bucheon-si (KR); Myoung-Won Kim, Seongnam-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 197 days.

(21) Appl. No.: 12/190,779

(22) Filed: Aug. 13, 2008

(65) Prior Publication Data

US 2009/0060487 A1 Mar. 5, 2009

(30) Foreign Application Priority Data

Sep. 3, 2007 (KR) .................. 10-2007-0088966

(51) Int. Cl.
*G03B 3/10* (2006.01)
*G03B 13/34* (2006.01)
(52) U.S. Cl. ........................................ 396/133; 396/93
(58) Field of Classification Search .................... 396/133
See application file for complete search history.

(56) References Cited

U.S. PATENT DOCUMENTS

| | | | | |
|---|---|---|---|---|
| 4,908,647 A * | 3/1990 | Ueyama | ...................... | 396/135 |
| 5,155,347 A * | 10/1992 | Nishibe | ...................... | 250/201.8 |
| 5,325,145 A * | 6/1994 | Hirasawa | ...................... | 396/81 |
| 5,502,537 A * | 3/1996 | Utagawa | ...................... | 396/95 |
| 5,574,535 A * | 11/1996 | Ogasawara | ...................... | 396/95 |
| 5,615,397 A * | 3/1997 | Shiomi et al. | ...................... | 396/55 |
| 5,890,021 A | 3/1999 | Onoda | ...................... | 396/121 |
| 5,895,129 A * | 4/1999 | Ohta | ...................... | 396/79 |
| 5,946,504 A * | 8/1999 | Hirasawa et al. | ...................... | 396/80 |
| 5,966,550 A | 10/1999 | Oono et al. | ...................... | 396/82 |
| 5,999,746 A | 12/1999 | Kitagawa | ...................... | 396/52 |
| 7,480,453 B2 * | 1/2009 | Lin | ...................... | 396/87 |
| 2006/0078323 A1 * | 4/2006 | Nakahara | ...................... | 396/127 |
| 2006/0119732 A1 * | 6/2006 | Ohta | ...................... | 348/347 |
| 2007/0280666 A1 * | 12/2007 | Nakahara | ...................... | 396/125 |
| 2009/0085558 A1 * | 4/2009 | David et al. | ...................... | 324/207.2 |

FOREIGN PATENT DOCUMENTS

| | | |
|---|---|---|
| CN | 1188904 | 7/1998 |
| CN | 1444391 | 9/2003 |
| EP | 1463305 A1 * | 9/2004 |
| GB | 2266781 | 11/1993 |

* cited by examiner

*Primary Examiner* — W. B. Perkey
*Assistant Examiner* — Bret Adams
(74) *Attorney, Agent, or Firm* — Cha & Reiter, LLC (57) ABSTRACT

Disclosed is an apparatus and method for auto-focusing a camera, which includes the steps of detecting an initial value of an encoder by measuring an initial position of a lens system, matching the measured initial value of the encoder with the initial position value of the lens system to be moved, measuring a distance value of a subject through a distance measuring sensor, determining a displacement that a focus lens has to be moved with respect to the measured distance value, and adjusting a position of the focus lens such that a position value of the focus lens actually moved is the same as the displacement value.

16 Claims, 8 Drawing Sheets

DMS (distance measuring sensor)
Tx (transmitter), Rx (receiver)
X : DISPLACEMENT OF FOCUS LENS
L : DISTANCE TO SUBJECT

AUTO-FOCUSING APPARATUS AND METHOD FOR CAMERA

CLAIM OF PRIORITY

This application claims the benefit under 35 U.S.C. §119 of an application entitled "Auto-Focusing Apparatus and Method for Camera" filed in the Korean Intellectual Property Office on Sep. 3, 2007 and assigned Serial No. 2007-88966, the contents of which are hereby incorporated by reference in its entirety.

BACKGROUND OF THE INVENTION

1. Field of the Invention

The present invention relates to a camera, and more particularly to a method and apparatus for auto-focusing a camera by utilizing a distance measuring sensor and an encoder.

2. Description of the Related Art

Conventional cameras include a lens system for forming images of subjects on film or an image sensor. An image sensor detects the images formed by the lens system and converts them to electrical signals. In either case, the film or the surface of the image sensor is an image plane. The focus of the lens system varies its position in accordance with distances between the lens and the subjects. Thus, pictures of good quality focus can only be obtained when an amount of variation of the position of the image plane with respect to the position of a subject is within the depth of focus of the camera. That is, in order for the camera to obtain clear images, the light receiving plane of the image sensor should be positioned within the depth of focus of the lens system.

Common cameras, especially cameras with a macro function which has a great variation of focal position with respect to variation of the distance to the subject, i.e. cameras with a close-up function, should be provided with a device capable of moving the position of the lens to account for the distance to the subject. Cameras that automatically adjust the relative position are called Auto Focus (AF) cameras. In order to play a leading role in multimedia communication today, it may be essential for cameras to have such an AF function.

Controlling the AF function of a camera may be typically divided into a passive method and an active method according to a measurement manner of the distance between the camera and the subject.

The passive method obtains edge values appropriate for adjusting focus by detecting high frequency components of an image obtained from the image sensor and moving the lens to a position with a maximum edge value. A driving unit moves the focus lens step by step in response to a control signal of a controller to obtain the maximum edge value. Since this passive method allows for obtaining information on focus control from the image signal without additional devices and has high accuracy while allowing a small size device, it is widely applied to most cameras. An inner configuration of a camera using the passive method above is described with reference to FIG. 1.

Figure 1:
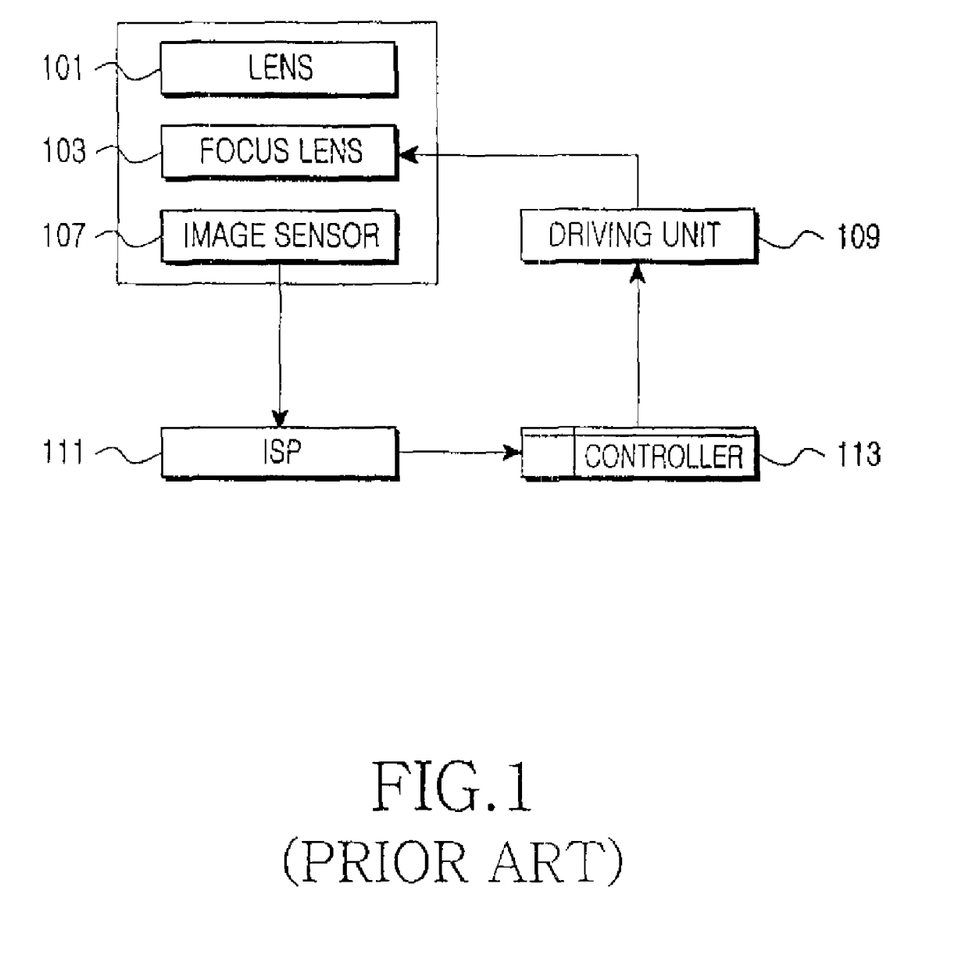
FIG. 1 is a view illustrating an inner configuration of a camera with a prior art passive auto-focusing function.

FIG. 1 is a view illustrating a prior art inner configuration of a camera with the passive auto-focusing function.

Referring to FIG. 1, the camera with the passive auto-focusing function includes a lens 101 for forming an image of an subject, a focus lens 103 for accurately focusing the formed image, an image sensor 107 for detecting the formed image as electric signals, a driving unit 109 for moving the focus lens, the ISP (Image Signal Processor) 111 for processing an image signal input from the image sensor and a driving current per frame unit, and the controller 113 for controlling the driving unit 109.

With reference to the above configuration, a method for obtaining edge values and moving the focus lens 103 to a position with a maximum edge value is described below.

Figure 2:
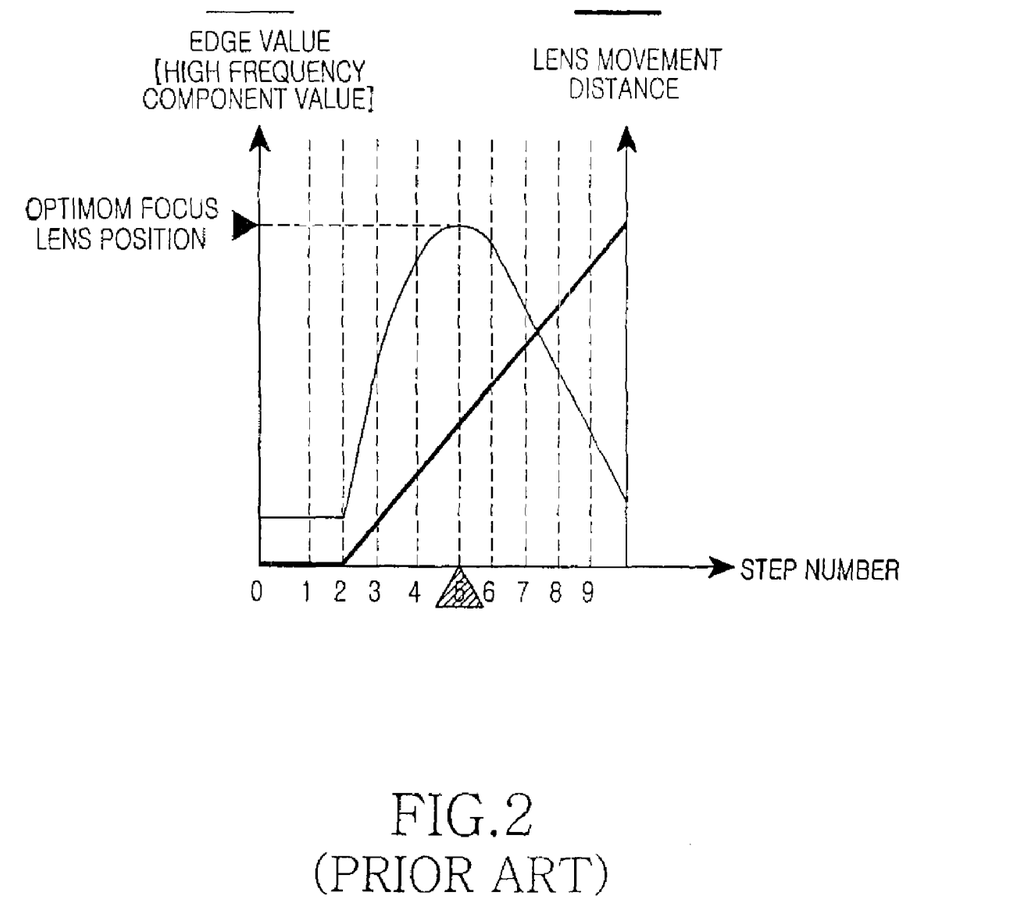
FIG. 2 is a graph illustrating variation of edge values according to positions of the lens of the camera with the prior art passive auto-focusing function.

FIG. 2 is a graph illustrating a prior art variation of edge values according to positions of the lens of the camera with the conventional passive auto-focusing function.

Referring to FIG. 2, a movement distance of the focus lens for performing the auto-focusing is divided into 10 sections, from 0 to 9, according to the number of steps. The edge values for every step is detected while moving the focus lens sequentially from step 0 to step 9. If step 5 has the maximum edge value of the detected edge values as shown in FIG. 2, then the auto-focusing function is achieved by moving the focus lens again to a position which has a fifth edge value corresponding step 5.

According to the active method, a distance measuring sensor emits infrared rays, ultrasonic waves, lasers, or any other type of radiation suitable to measure distances toward the subject in order to measure the distance between the camera and the subject. The active method advantageously works effectively in the dark, but requires additional hardware such as the distance measuring sensor to emit and detect signals. An inner configuration of the camera with the active auto-focusing function is described below with reference to FIG. 3.

Figure 3:
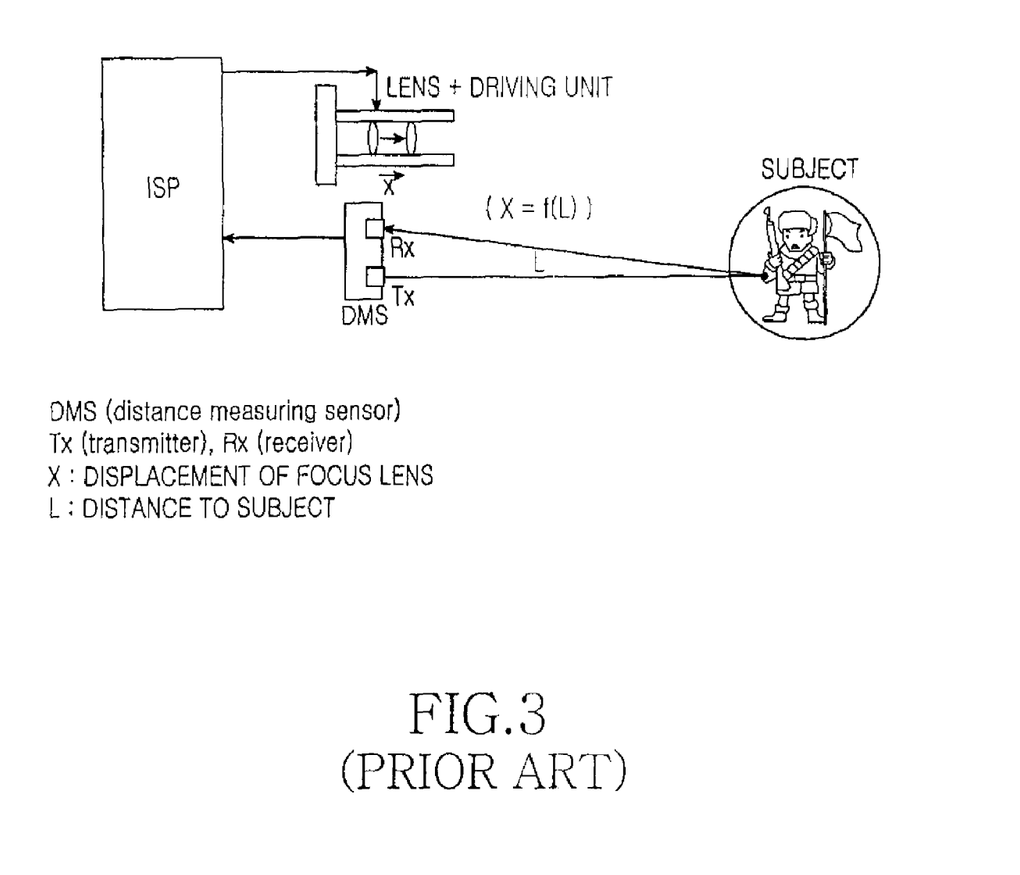
FIG. 3 is a view illustrating an inner configuration of a camera with the prior art active auto-focusing function.

FIG. 3 is a view illustrating an inner configuration of a camera according to a prior art conventional active auto-focusing function.

Referring to FIG. 3, the camera with an active auto-focusing function includes a lens for forming an image of an subject, a focus lens for accurately focusing the formed image, a driving unit for moving the focus lens, the ISP for processing an image signal input from an image sensor and a driving current per frame unit, and a distance measuring sensor for measuring a distance between the camera and the subject, etc.

Assuming that a light emitted from the distance measuring sensor is an infrared ray, the infrared ray emitted from a transmitter Tx of the distance measuring sensor is reflected from the subject and detected by a receiver Rx of the distance measuring sensor. This obtains the distance L between the camera and the subject. The obtained value is transferred to the ISP. The ISP receiving the distance value L determines, through a predetermined algorithm, a displacement x that the focus lens has to be moved. The displacement x can be represented by equation (1) below.

$$x = f(L) \quad (1)$$

Equation (1) above represents the displacement x when the distance between the camera and the subject is L. The auto-focusing Equation (1) is described below with reference to FIG. 4.

Figure 4:
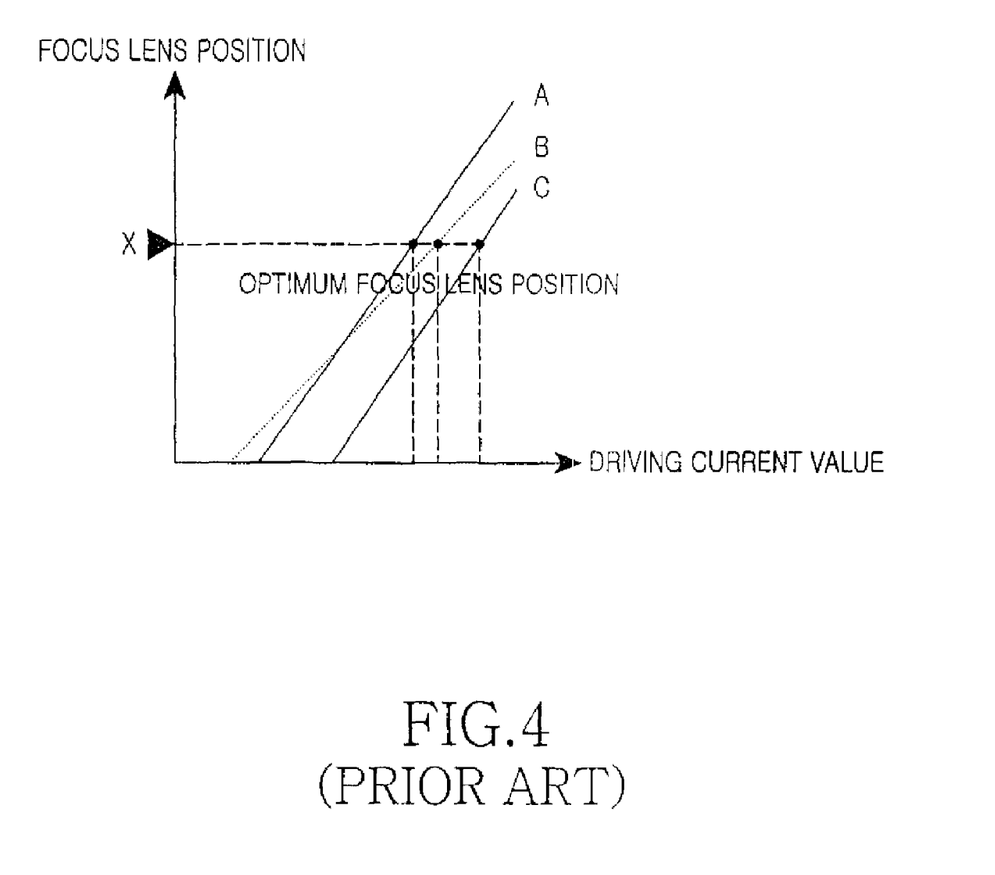
FIG. 4 is a graph illustrating position variations of focus lenses according to inputs, such as currents or voltages, transferred to driving units of the cameras with the active auto-focusing function.

FIG. 4 is a prior art graph illustrating position variations of focus lenses according to inputs, such as currents or voltages, transferred to driving units of the cameras with the active auto-focusing function. Variations in accordance with the respective driving units are represented by A, B, and C.

Referring to FIG. 4, due to characteristic variation of driving units, i.e. characteristic variation according to elements constituting a voice coil motor (VCM), for example, a spring constant k, the number of winding turns of the coil, mechanical interference, etc., initial driving current values for moving the focus tenses to a position where the subject is in complete focus, i.e. "x", and the slopes of A, B, and C at "x" are different from each other.

As described above, the passive and active methods are used differently according to purposes and characteristics thereof. The driving units employed by each method are both manufactured in order to increase manufacturing yield such that initial driving currents to start the driving units and slopes according to the currents are kept within respective predetermined ranges.

However, when AF cameras are manufactured in the above way to increase manufacturing yield, instead of applying accurate driving currents to corresponding driving units, a minimum current value of the ranges determined for the process' sake is collectively applied to all driving units. Therefore, a common driving current is applied to the driving units, even though each driving unit may have different driving current values of their own. The applied current value is not the most suitable to the respective driving units. Accordingly, in some cases of auto-focus modules, there are auto focus steps which are actually not used therein, thereby increasing auto-focusing time thereof. Besides this common problem, the above passive and active methods have their respective problems.

A problem with the passive method is since the focus lens is positioned at the step having the maximum edge value after it is moved step by step to detect edge values, auto-focusing time is relatively long because each step must be undertaken. Additionally, due to this relatively time consuming process, it is difficult to successively perform auto-focusing when taking moving pictures, and thus quite difficult to obtain clear moving images, resulting in customer dissatisfaction.

The active method has a problem that individual algorithms are required for the respective driving units in order to move the focus lenses to their positions having maximum edge value since each driving unit has a different displacement value according to characteristics of manufacturing processes. Such algorithms themselves are difficult to implement, and implementing the individual algorithms increases manufacturing cost.

In order to improve the problems above, an auto-focusing method is required that can ensure a fast operation characteristic of a camera, irrespective of driving currents of driving units.

SUMMARY OF THE INVENTION

Accordingly, the present invention has been made to solve at least the above-mentioned problems occurring in the prior art. The present invention provides an apparatus and method for auto-focusing a camera, which can perform auto-focusing irrespective of characteristics of driving units by using a distance measuring sensor and a driving unit of an encoder type. This allows fast auto-focusing when taking still pictures and successive auto-focusing when taking moving pictures.

In accordance with an aspect of the present invention, there is provided a method of auto-focusing a camera, which includes the steps of: detecting an initial value of an encoder by measuring an initial position of a lens system; matching the measured initial value of the encoder with an initial position value of the lens system; measuring a distance value of a subject through a distance measuring sensor; determining a displacement that a focus lens has to be moved with respect to the measured distance value; and adjusting a position of the focus lens such that a position value of the focus lens moved is the same as the displacement value.

In accordance with another aspect of the present invention, there is provided an apparatus for auto-focusing a camera, which includes an encoder for detecting an initial value by measuring an initial position of a lens system; a distance measuring sensor for measuring a distance to a subject and transferring the measured value to an image signal processor (ISP); the ISP for receiving the initial value of the encoder and matching the initial value with a starting position of auto-focusing, and for detecting a displacement which a focus lens has to be moved with respect to the measured value received from the distance measuring sensor; and a controller for adjusting a position value of the focus lens such that a position of the moved focus lens is the same as the displacement value.

In accordance with the present invention as described above, there is provided an advantage in that since the apparatus having the same movement characteristics can be achieved irrespective of the characteristics of the driving units, the auto-focusing is performed in only one frame or less so that the auto-focusing can be performed quickly and successively, differently than the conventional auto-focusing process, wherein several frames are required for each step.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE INVENTION

Hereinafter, exemplary embodiments of the present invention will be described with reference to the accompanying drawings. Further, various specific definitions found in the following description are provided only to help general understanding of the present invention, and it is apparent to those skilled in the art that the present invention can be implemented without such definitions.

As mentioned in the description of the prior art, in the case of the known passive auto-focusing method, the minimum current value of the driving current values for the VCMs determined for the process' sake is collectively applied to all of the VCMs. Thus, each driving unit does not have an optimum driving current value, and auto-focusing time is wasted and lengthened. In addition, after the maximum edge value has been detected, the focus lens is moved to the corresponding step in order to perform auto-focusing, increasing the time needed to perform auto-focusing.

In the case of the prior art active auto-focusing method, the individual initial driving value is discordant with the corresponding VCM and thus the focus lens is not accurately positioned. To combat this problem the individual algorithm is required to be applied to the corresponding VCM, thereby making it difficult to mass-produce the camera.

Therefore, the present invention has been made to solve the above-mentioned problems occurring in the prior art, and the present invention provides an apparatus and method for auto-focusing a camera, which can perform auto-focusing irrespective of characteristics of driving units by using an distance measuring sensor and a driving unit of an encoder type, thereby allowing fast and successive auto-focusing without wasting auto-focusing time. Hereinafter, the present invention will be described in detail with reference to the accompanying drawings.

Figure 5:
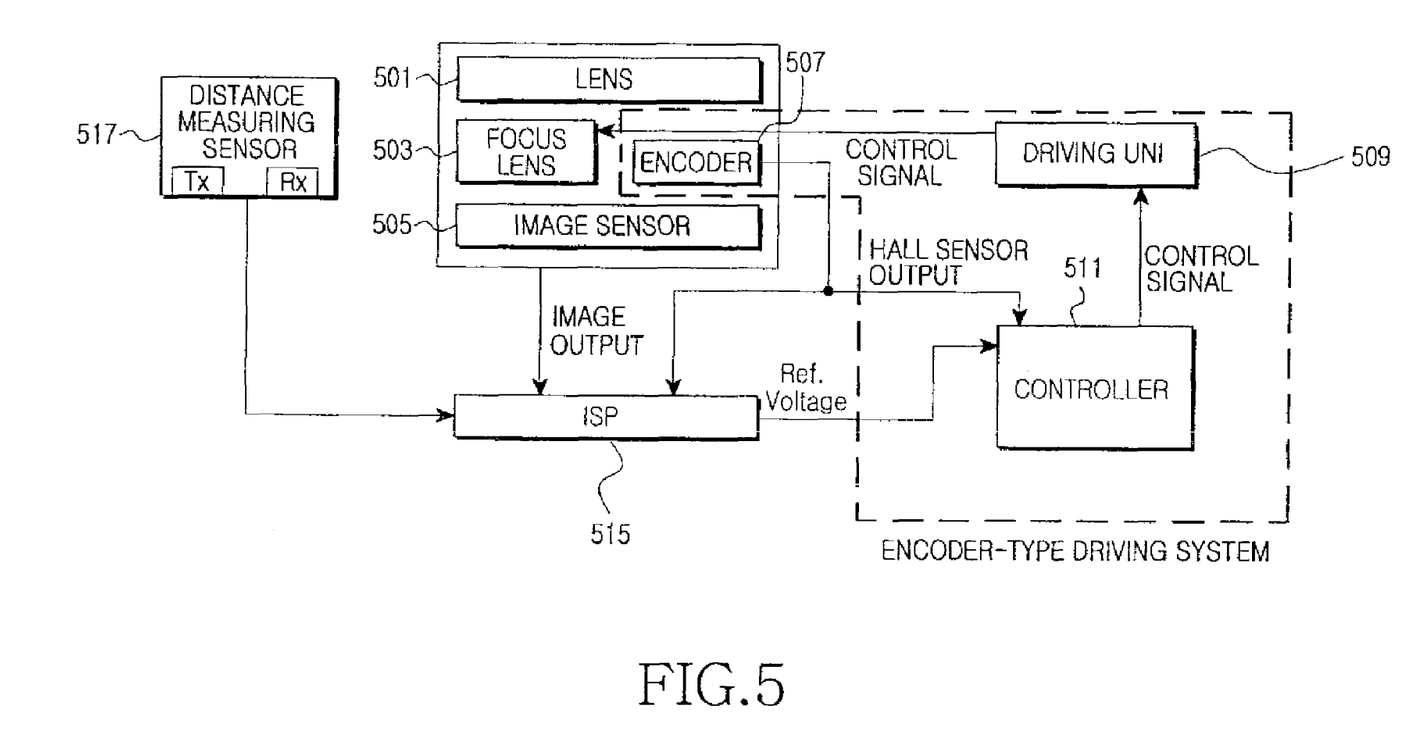
FIG. 5 is a block diagram illustrating an inner configuration of a camera which performs auto-focusing by using a distance measuring sensor in accordance with an embodiment of the present invention.

FIG. 5 is a block diagram illustrating an inner configuration of a camera which performs auto-focusing by using a distance measuring sensor in accordance with an embodiment of the present invention.

Referring to FIG. 5, the camera includes a distance measuring sensor 517 for measuring a distance between the camera and a subject and transferring the measured value to an image signal processor (ISP) 515. A lens 501 forms an image of the subject, and a focus lens 503 accurately focuses the formed image. An image sensor 505 for detects the formed image as electric signals, and an encoder 507 detects an initial position of the focus lens 503 and transfers a position signal of the moved focus lens 503 to the ISP 515 and a controller 511. A driving unit 509 moves the focus lens 503 based on how the ISP 515 determines a displacement which the focus lens 503 has to be moved by using an image signal input from the image sensor 505 and data detected by the distance measuring sensor 517. The controller 511 controls the driving unit 509. The encoder 507 shown in FIG. 5 includes a hall sensor and a permanent magnet and can recognize a value from which the lens actually starts moving when auto-focusing by using an initial value of the encoder. The controller 511 can be constructed as a single chip that also includes a feedback control circuit and a driver and is operative to control the driving unit by using control signals.

A CMOS (Complementary Metal-Oxide Semiconductor) or a CCD (Charge-Coupled Device) is typically used for the image sensor 505 that is operative to convert optical signals received through the lens into electrical signals.

Hereinafter, respective functions of the above components of FIG. 5 are described.

The distance measuring sensor 517 uses infrared rays, ultrasonic waves, lasers, or any other type of radiation suitable to measure distances as a transmission medium signal, and has a transmitter TX for emitting the transmission medium signal to the subject. The signal reflected from the subject is received at a receiver Rx, and thus, the distance to the subject is measured and the measured value is transferred as a current or voltage to the ISP 515.

The ISP 515 performs an image signal process for processing image data transmitted from the distance measuring sensor 517. The ISP 515 receives a position value at which the focus lens 503 starts moving when the auto-focusing starts, i.e. the initial value of the encoder from the encoder 507, and stores the value. The ISP 515 determines a position to which the focus lens 503 should be moved by comparing the current or voltage received from the distance measuring sensor 517 with an inner algorithm, and transfers it to the controller 511.

The encoder 507 including the permanent magnet and the hall sensor is operative to move along with the movement of the focus lens 503, and it transfers a point of time at which the focus lens 503 starts to be moved by the driving unit 509 to the ISP 515, measures an actual movement distance of the focus lens 503, and transfers the measured movement distance to the controller 511.

Figure 6:
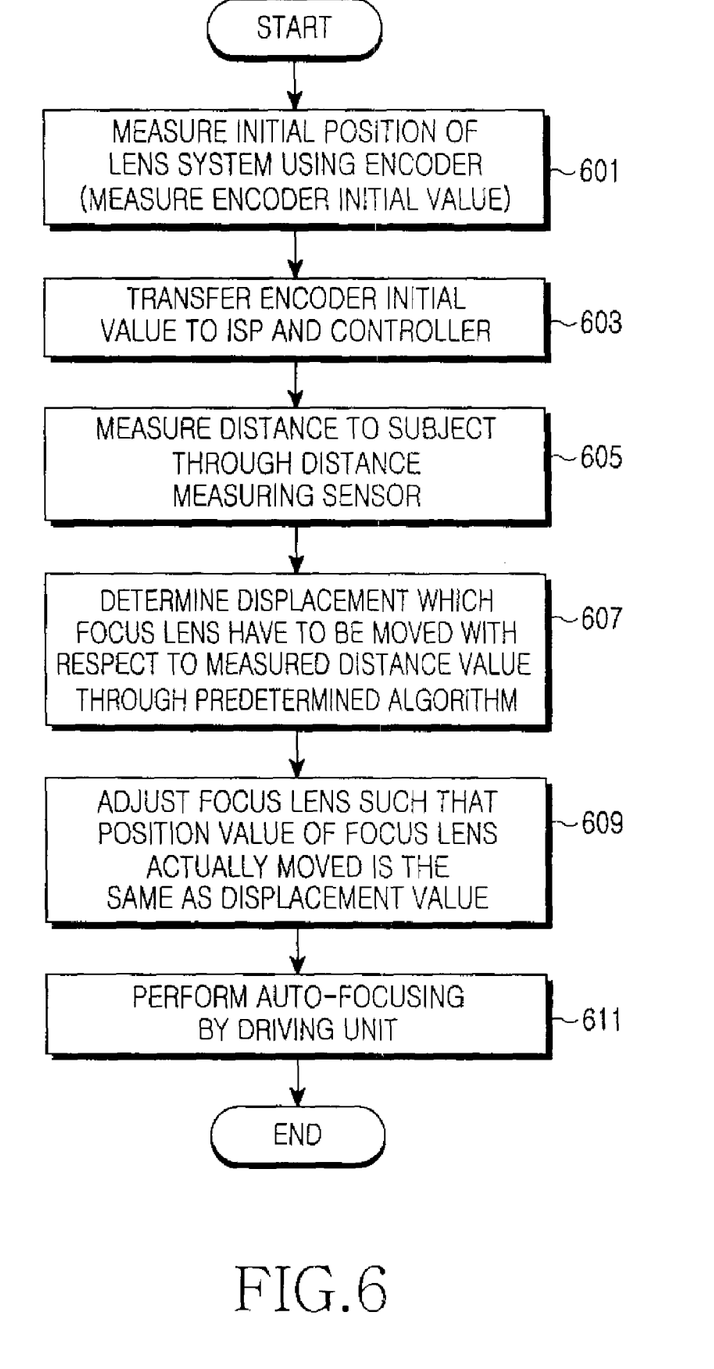
FIG. 6 is a flowchart illustrating a process for performing auto-focusing of a camera including a distance measuring sensor and an encoder in accordance with an embodiment of the present invention.

Hereinafter, a process for performing the auto-focusing based on the components of FIG. 5 will be described with reference to a flowchart below.

FIG. 6 is a flowchart illustrating a process for performing the auto-focusing of the camera including the distance measuring sensor and the encoder in accordance with an embodiment of the present invention, in which the process includes the step of detecting the initial value of the encoder and the step of controlling the focus lens based on the distance measured through the distance measuring sensor.

Referring to FIG. 6, the encoder detects an initial position of a lens system at step 601. The detected initial position value of the lens system becomes an initial value of the encoder. When detecting the initial value of the encoder, the encoder transfers the detected initial value of the encoder to the ISP at step 603. The ISP matches the measured initial value of the encoder with an initial position value of the lens system that corresponds to a location from which the lens starts moving when the auto-focusing begins. By matching the initial value of the encoder with a first start point of steps for the auto-focusing, superfluous steps can be removed. Here, the initial position value of the encoder to be transferred may vary according to characteristics of driving devices. Then, the distance measuring sensor measures the distance to the subject at step 605. For the measurement of the distance to the subject, the transmitter Tx of the distance measuring sensor emits a signal to the subject, and the receiver Rx receives the signal reflected from the subject. The distance value between the camera and the subject transfers from the distance measuring sensor to the ISP 515.

At step 607, the ISP 515 (having received the distance between the camera and the subject) determines, through a predetermined algorithm, a displacement x which the focus lens has to be moved, i.e. a variation of the encoder value from the initial value of the encoder for adjusting focus. Let the distance between the camera and the subject be "L". Due to the linear controlling of a scaling factor of the initial value of the encoder, the algorithm for determining the displacement x can be implemented according to equation (2) below irrespective of initial driving currents of respective driving units.

$$1/a + 1/b = 1/f \quad (2)$$

Equation (2) above is a focal length equation applied to the present invention, in which "a" is a distance between the focus lens and the subject, "b" is a distance between the focus lens and a surface of the image sensor, and "f" is a focal length of the lens, respectively.

Since f is defined as a constant value depending on the characteristics of the lens, b represents the distance between the focus lens and the surface of the image sensor and is also defined. Thus, the distance that the focus lens has to be moved can be determined by subtracting the initial position value of the lens (the distance between the surface of the image sensor and the focus lens when there is no input to VCM) from b. Since the displacement value x that the focus lens has to be actually moved represents a distance that the focus lens has to be moved and is based in part upon the distance L to the subject irrespective of the respective driving units, it can be represented by the following general equation irrespective of the characteristics of the driving units.

$$x=f(L)=fA(L)=fB(L)=fC(L) \quad (3)$$

Equation (3) above is obtained by modifying the algorithm used to evaluate the displacement using the distance measuring sensor when the auto-focusing is performed according to the present invention. "L" is the distance between the camera and the subject, "x" is the displacement value, i.e. a position of the lens where the subject is in complete focus, and the equation indicates that one algorithm can process an exemplary case where there are driving units A, B, and C which have characteristic variation.

The ISP 515 determines the displacement value x using equation (3) irrespective of the characteristics of the driving units, and transfers the movement distance value of the focus lens according to the displacement value to the controller 511 in order to move the focus lens 503.

At step 609, the controller 511 sends a control signal to the driving unit 509 through the feedback control so that the value of the encoder determined in the ISP 515 and a value of the encoder come from the actual movement of the focus lens 503 become the same as each other. The driving unit 509 receiving the control signal moves the focus lens 503 to perform auto-focusing at step 611.

Figure 7:
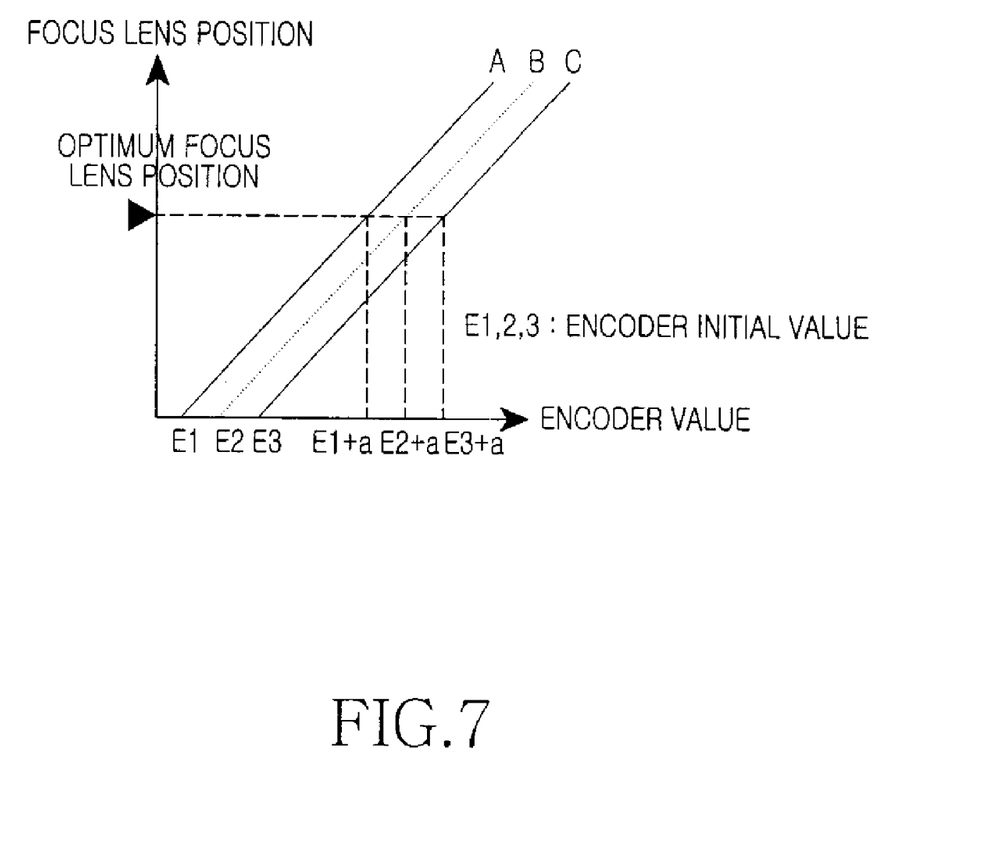
FIG. 7 is a graph illustrating a result of auto-focusing performed using initial values of encoders according to an embodiment of the present invention.

FIG. 7 is a graph illustrating a result of auto-focusing performed using the initial values of encoders according to an embodiment of the present invention. The initial values of the encoders for the respective driving units have different values E1, E2, and E3 according to the characteristics of the driving units. By storing such initial values of the encoders corresponding to the respective driving units while initiating their respective focus lenses whenever operating the cameras, respective control signals of the controllers necessary for initial movements of the respective focus lenses can always be recognized.

In addition, the prior art different slopes of the graphs according to the respective initial values of the driving units become constant slope due to the linear controlling of the scaling factor, whereby controlling the driving units can be achieved irrespective of driving currents of the respective driving units. In the present example, that is, for the same variations E1+a, E2+a, and E3+a, the same movements of the focus lenses are given. Also, when a point in time at which the value of each encoder starts varying, that is a point in time at which the corresponding driving unit start moving is checked and the initial value of each encoder is then compensated by one value, a graph of FIG. 8 can be obtained.

Figure 8:
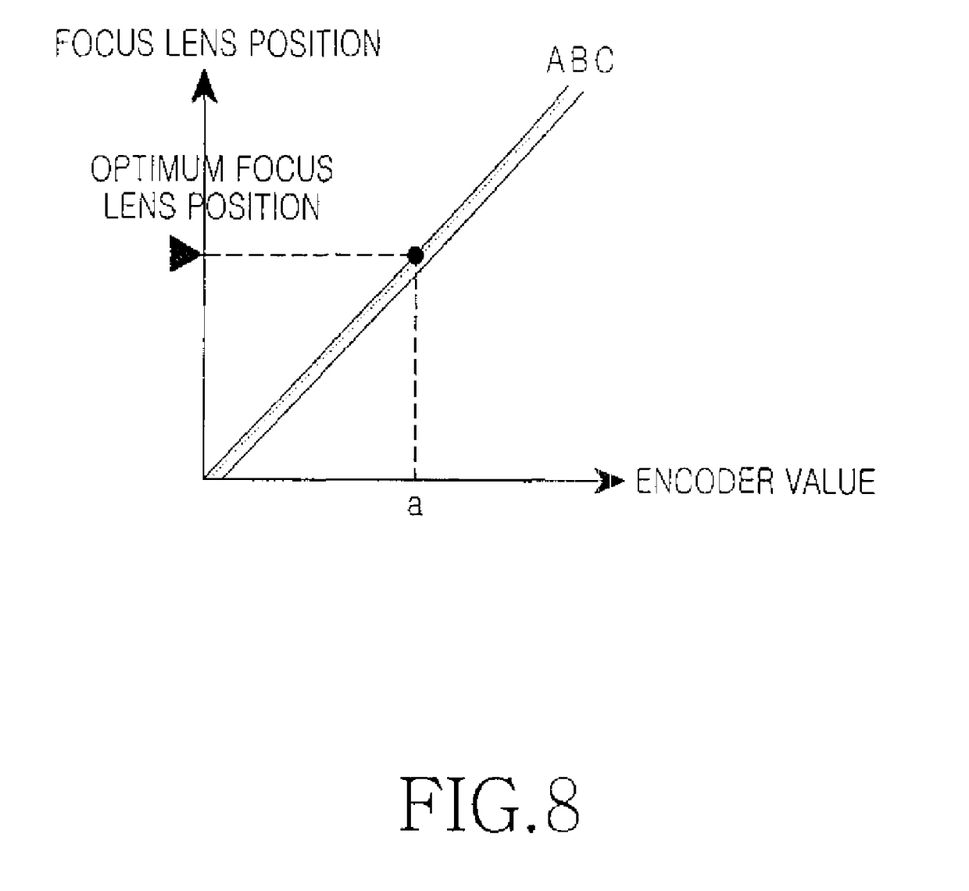
FIG. 8 is a graph illustrating a result of auto-focusing performed using compensated initial values of encoders according to an embodiment of the present invention.

FIG. 8 is a graph illustrating a result of auto-focusing according to an embodiment of the present invention, wherein the auto-focusing is performed after the initial values of the encoders are compensated for according to a method of the invention. Here, since the stored initial values E1, E2, and E3 of the encoders are considered when determining variations of the values of the encoders, all of the variations of the values of the encoders necessary for moving the respective focus lenses to their optimum focus position are the same as each other, for example reference "a". Since the variations are determined in consideration of the initial values of the encoders, the actual values of the encoders are E1+a, E2+a, and E3+a, respectively.

Here, the operation for moving the focus lens by using the displacement is performed in such a way that the distance is measured in a moment by using the distance measuring sensor 517 so that an optimum position can be determined in a shorter time than one frame, differently than the prior art method in which the point of the maximum edge value is found out while moving the focus lens step by step. In the prior art, the one frame corresponds to the time needed to scan one picture, so the number of the frames corresponding to the number of corresponding steps is required to scan all the edge values. In the present invention, since the distance can be accurately measured even though no image is scanned, the optimum position can be determined in a shorter time than one frame.

The configurations and operations of the apparatus and method for auto-focusing a camera can be accomplished as described above. While the invention has been shown and described with reference to certain exemplary embodiments thereof, it will be understood by those skilled in the art that various changes in form and details may be made therein without departing from the spirit and scope of the invention as defined by the appended claims. Accordingly, the scope of the present invention is not limited to the embodiments described above but is defined by the appended claim and equivalents thereof.

What is claimed is:

1. A method of auto focusing a camera, comprising the steps of:
    measuring an initial value of an encoder corresponding to a first control signal necessary for initial movements of a focus lens;
    measuring a distance value of a subject using a distance measuring sensor;
    determining a displacement that a focus lens has to be moved based on the measured distance value; and
    adjusting a position of the focus lens to be moved by a driver, such that a position value of the focus lens moved is substantially the same as the displacement value by transferring a second control signal according to the initial value of the encoder and the displacement value to the driver.

2. The method of auto-focusing as claimed in claim 1, wherein the measuring of the initial value of the encoder is performed by using a hall sensor of the encoder.

3. The method of auto-focusing as claimed in claim 2, wherein the initial value of the encoder may be detected as different initial values according to a mounting and position of a lens system.

4. The method of auto-focusing as claimed in claim 1, further comprising the step of: determining a value of a driving current that corresponds to the initial value of the encoder.

5. The method of auto-focusing as claimed in claim 1, wherein the determining of the displacement that the focus lens has to be moved with respect to the measured distance value is achieved according to the equation:

$$x=f(L)=fA(L)=fB(L)=fC(L),$$

wherein L is a distance between the lens and the subject, x is a position of the lens at which the subject is in complete focus, and A, B, and C are driving currents of respective different driving units.

6. The method of auto-focusing as claimed in claim 1, wherein the step of measuring of the distance of the subject using the distance measuring sensor comprises:
    measuring the distance, and
    determining a displacement determines an optimum position.

7. The method of auto-focusing as claimed in claim 6, further comprising the step of: linearly re-adjusting a position value of the lens system such that a scaling factor between a position of the lens actually moved and the displacement value fulfills the equation:

$$x=f(L)$$

where x equals a displacement, and L equal a distance between the camera and a subject.

8. The method of claim 1, wherein the determining step further comprises determining by a predetermined algorithm.

9. The method of claim 1, wherein the initial value is determined from at least one actual movement of the focus lens.

10. An apparatus for auto-focusing a camera, comprising:
an encoder, wherein an initial value of the encoder corresponds to a first control signal necessary for initial movements of a focus lens;
a distance measuring sensor for measuring a distance to a subject and transferring the measured distance value to an image signal processor (ISP);
the ISP receiving the initial value of the encoder and determining a displacement which a focus lens has to be moved based on the measured distance value received from the distance measuring sensor; and
a controller for adjusting a position value of the focus lens to be moved by a driver, such that a position of the moved focus lens is the same as the displacement value by transferring a second control signal according to the initial value of the encoder and the displacement value to the driver.

11. The apparatus of claim 10, wherein the controller comprises:
a feedback control circuit for linearly re-adjusting a position value of the focus lens such that a scaling factor between a position of the focus lens actually moved and the displacement value fulfills the equation:

$$x=f(L)$$

where x equals a displacement, and L equal a distance between the camera and a subject; and
a driver for moving the lens system by receiving the position value of the lens system re-adjusted at the feedback control circuit and controlling a motor of a driving unit adapted to move the focus lens.

12. The apparatus of claim 10, wherein the encoder includes a permanent magnet and a hall sensor.

13. The apparatus of claim 10, wherein the encoder is operative to move along with the movement of the focus lens.

14. The apparatus of claim 13, wherein the encoder transfers a point of time at which the focus lens starts to be moved by a driving unit to the ISP.

15. The apparatus of claim 14, wherein the encoder measures an actual movement distance of the focus lens, and transfers the measured movement distance to the controller.

16. The apparatus of claim 10, wherein the controller controls a driving unit irrespective of driving currents of similarly manufactured driving units.

* * * * *